(12) United States Patent
Shen et al.

(10) Patent No.: US 11,773,625 B2
(45) Date of Patent: Oct. 3, 2023

(54) CLUTCH ASSEMBLY OF ELECTRONIC CABINET LOCK

(71) Applicant: XIAMEN MAKE SECURITY TECHNOLOGY CO., LTD., Fujian (CN)

(72) Inventors: Yibin Shen, Xiamen (CN); Guanghui Luan, Xiamen (CN); Lisheng Qiu, Xiamen (CN); Shutie Wu, Xiamen (CN)

( * ) Notice: Subject to any disclaimer, the term of this patent is extended or adjusted under 35 U.S.C. 154(b) by 393 days.

(21) Appl. No.: 17/289,739

(22) PCT Filed: Dec. 18, 2018

(86) PCT No.: PCT/CN2018/121672
§ 371 (c)(1),
(2) Date: Apr. 29, 2021

(87) PCT Pub. No.: WO2020/124344
PCT Pub. Date: Jun. 25, 2020

(65) Prior Publication Data
US 2022/0003022 A1 Jan. 6, 2022

(51) Int. Cl.
| | |
|---|---|
| *E05B 65/44* | (2006.01) |
| *F16D 15/00* | (2006.01) |
| *E05B 45/06* | (2006.01) |
| *E05B 47/00* | (2006.01) |

(52) U.S. Cl.
CPC .............. *E05B 65/44* (2013.01); *F16D 15/00* (2013.01); *E05B 45/06* (2013.01); *E05B 47/0012* (2013.01); *E05B 2045/0665* (2013.01); *E05B 2047/002* (2013.01); *E05B 2047/0017* (2013.01); *E05B 2047/0024* (2013.01); *E05B 2047/0026* (2013.01); *E05B 2047/0036* (2013.01); *E05B 2047/0069* (2013.01)

(58) Field of Classification Search
CPC .............. E05B 65/44; E05B 2047/002; E05B 2047/0024; E05B 2047/0026; E05B 47/00; E05B 47/0603; E05B 47/0619; E05B 47/0626; E05B 47/0646; E05B 47/0665; E05B 47/0676; E05B 47/0684; F16D 15/00; F16D 2023/123; E05C 1/06
USPC .......................................................... 192/71
See application file for complete search history.

(56) References Cited

U.S. PATENT DOCUMENTS

| | | | | |
|---|---|---|---|---|
| 2007/0267269 A1* | 11/2007 | Benoit | .................. | E05F 15/611 |
| | | | | 192/93 C |
| 2013/0015671 A1* | 1/2013 | Calleberg | ............ | E05B 47/0692 |
| | | | | 292/144 |

FOREIGN PATENT DOCUMENTS

KR  200186546 Y1 * 7/2000  ......... E05B 47/0001

* cited by examiner

*Primary Examiner* — Richard M Lorence
*Assistant Examiner* — Aimee Tran Nguyen

(57) ABSTRACT

A clutch assembly of an electronic cabinet lock includes a cam, a camshaft, a gear disc, a sleeve, a snap ring, and a steel ball. The cam includes a sleeve ring at its inner end and a swing arm at its outer end. The camshaft is sleeved within the sleeve ring by clearance fit, and the sleeve ring is sleeved within the sleeve by clearance fit. The gear disc is sleeved on the outer wall of the sleeve. The steel ball is mounted in a through groove of the side wall of the cam. The steel ball is located between the sleeve and the cam and is tangent to the camshaft. The camshaft is provided with a groove, and the groove allows the steel ball to fall in. The snap ring is engaged in an annular groove of the lower end of the camshaft for restricting the sleeve.

1 Claim, 3 Drawing Sheets

CLUTCH ASSEMBLY OF ELECTRONIC CABINET LOCK

BACKGROUND OF THE INVENTION

1. Field of the Invention

The present invention relates to a lock, and more particularly to a clutch assembly of an electronic cabinet lock.

2. Description of the Prior Art

With the improvement of the economic level, electronic locks have been widely used in homes, hotels, enterprises, and public places. A motor is also widely used in electronic locks. The output transmission of a worm wheel and a worm screw allows the motor to drive a larger load with low power consumption. However, due to the self-locking of the worm wheel and worm screw, the mechanism cannot be driven in the reverse direction and cannot be unlocked by an external drive. In addition, traditional separate electronic locks further have the following defects:
1. Traditional separate electronic locks with emergency unlocking function generally use oblique lock tongues. Most straight lock tongues cannot be unlocked mechanically in an emergency due to their own requirements.
2. Traditional separate electronic locks generally use plastic casings with low strength and low safety performance.
3. Most of the traditional separate electronic locks are not waterproof and have poor practicability.
4. Most of the traditional separate electronic locks do not have a mounting plate. The installation efficiency is low.

SUMMARY OF THE INVENTION

The primary object of the present invention is to provide a clutch assembly of an electronic cabinet lock with stable and reliable motion.

In order to achieve the above objects, the present invention adopts the following technical solutions:

A clutch assembly of an electronic cabinet lock comprises a cam, a camshaft, a gear disc, a sleeve, a snap ring, and a steel ball. The cam includes a sleeve ring at an inner end thereof and a swing arm at an outer end thereof. The sleeve ring is sleeved on the camshaft by clearance fit, and the sleeve ring is inserted in the sleeve by clearance fit. The gear disc is sleeved on an outer wall of the sleeve. The steel ball is mounted in a through groove of a side wall of the cam. The steel ball is located between the sleeve and the cam, and the steel ball is tangent to the camshaft. The camshaft is provided with a groove. The groove is configured to receive the steel ball therein. The snap ring is engaged in an annular groove of a lower end of the camshaft for restricting the sleeve.

After adopting the above solutions, since the present invention comprises a cam, a camshaft, a gear disc, a sleeve, a snap ring and a steel ball, a motor may drive the gear disc of the clutch assembly by means of a gear set. When the gear disc begins to rotate, the sleeve is driven to rotate. The sleeve enables the cam to rotate by means of the transmission force of the steel ball, so that the cam may drive a lock tongue to rotate. Each part cooperates with each other, and the motions are stable and reliable.

Embodiments of the present invention will now be described, by way of example only, with reference to the accompanying drawings.

DETAILED DESCRIPTION OF THE PREFERRED EMBODIMENTS

Figure 1:
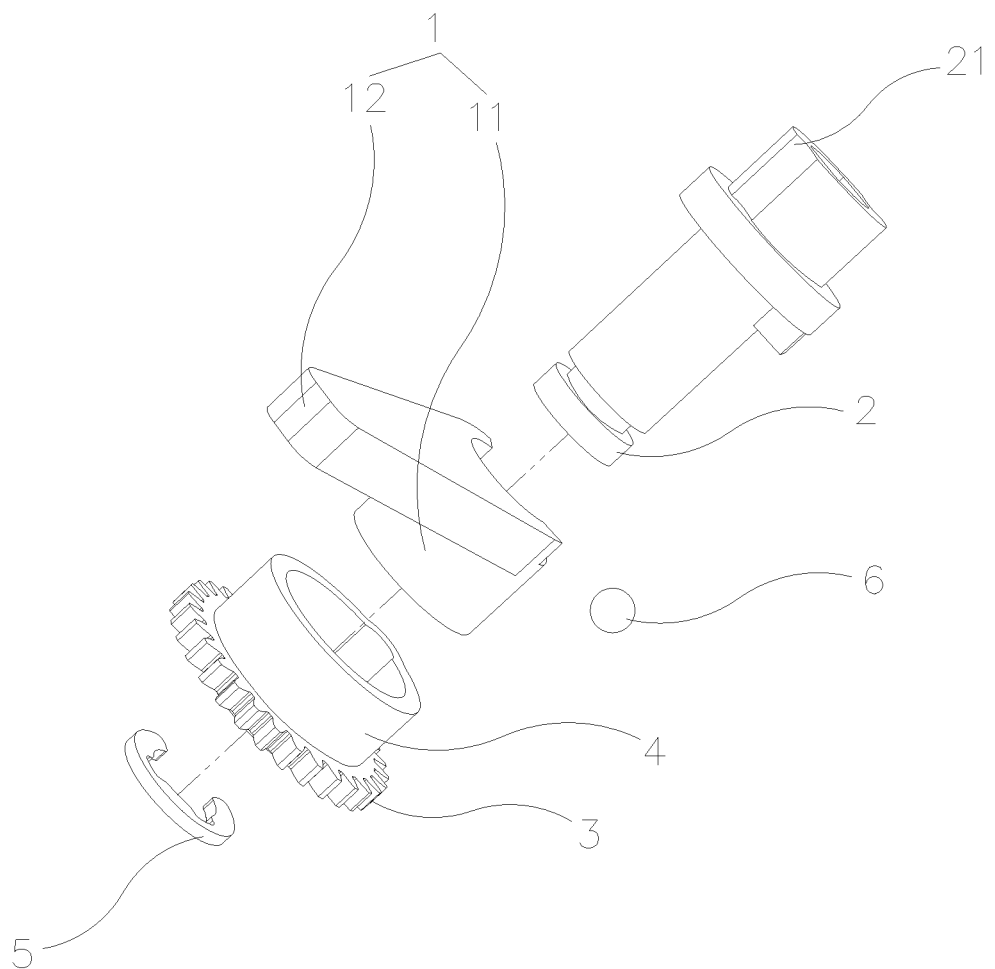
FIG. 1 is an exploded view of the clutch assembly of the present invention.
Figure 2:
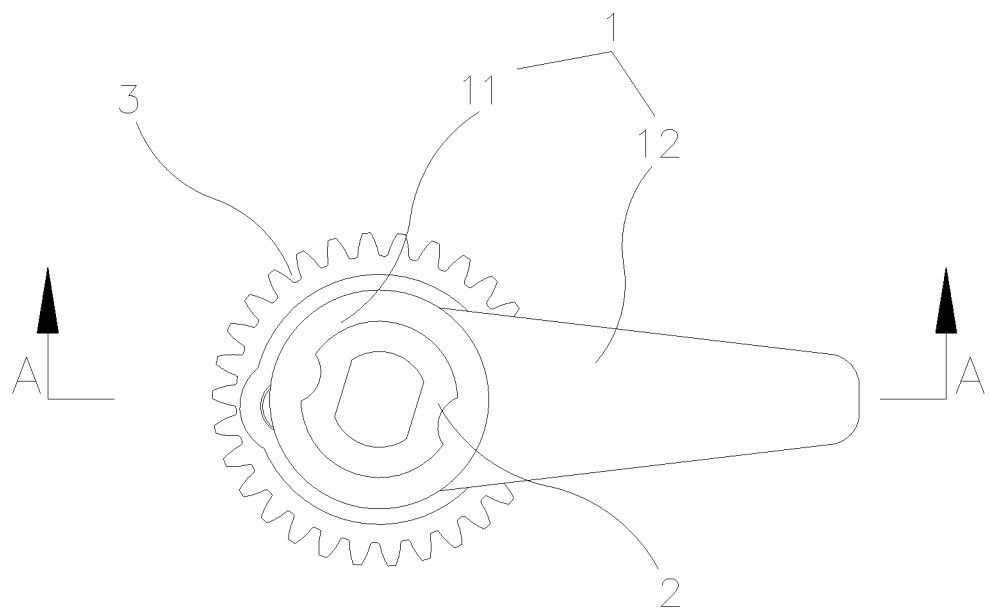
FIG. 2 is a front view of unlocking the clutch assembly of the present invention.
Figure 3:
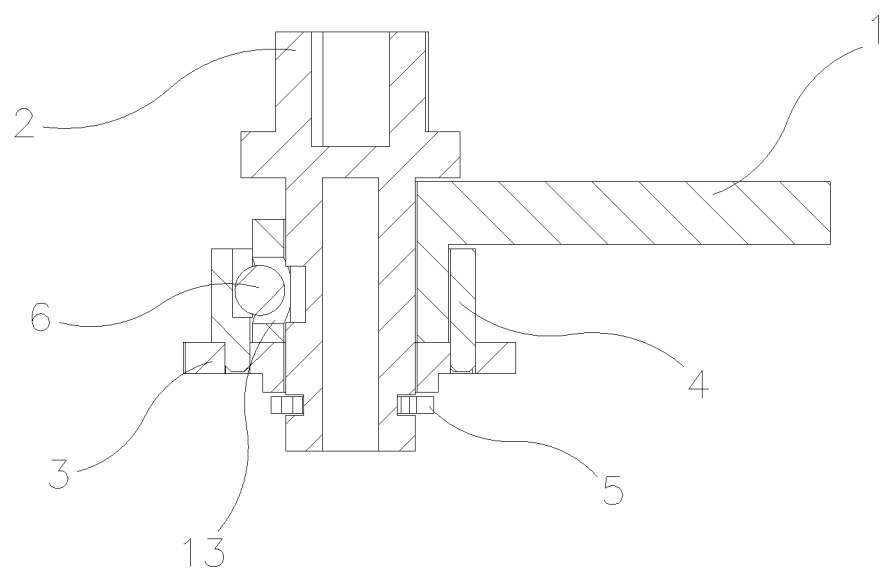
FIG. 3 is a cross-sectional view taken along line A-A of FIG. 2.

As shown FIGS. 1 to 3, the present invention discloses a clutch assembly of an electronic cabinet lock, comprising a cam 1, a camshaft 2, a gear disc 3, a sleeve 4, a snap ring 5 and a steel ball 6.

The cam 1 includes a sleeve ring 11 at its inner end and a swing arm 12 at its outer end. The sleeve ring 11 is sleeved on the camshaft 2 by clearance fit. The sleeve ring 11 is inserted in the sleeve 4 by clearance fit. The gear disc 3 is sleeved on the outer wall of the sleeve 4. The steel ball 6 is mounted in a through groove 13 of the side wall of the cam 1. The steel ball 6 is located between the sleeve 4 and the cam 1, and the steel ball 6 is tangent to the camshaft 2. The camshaft 2 is provided with a groove 21. The groove 21 is configured to receive the steel ball 6 therein. The snap ring 5 is engaged in an annular groove of the lower end of the camshaft 2 for restricting the sleeve 4.

The working principle of the present invention is described below.

Figure 4:
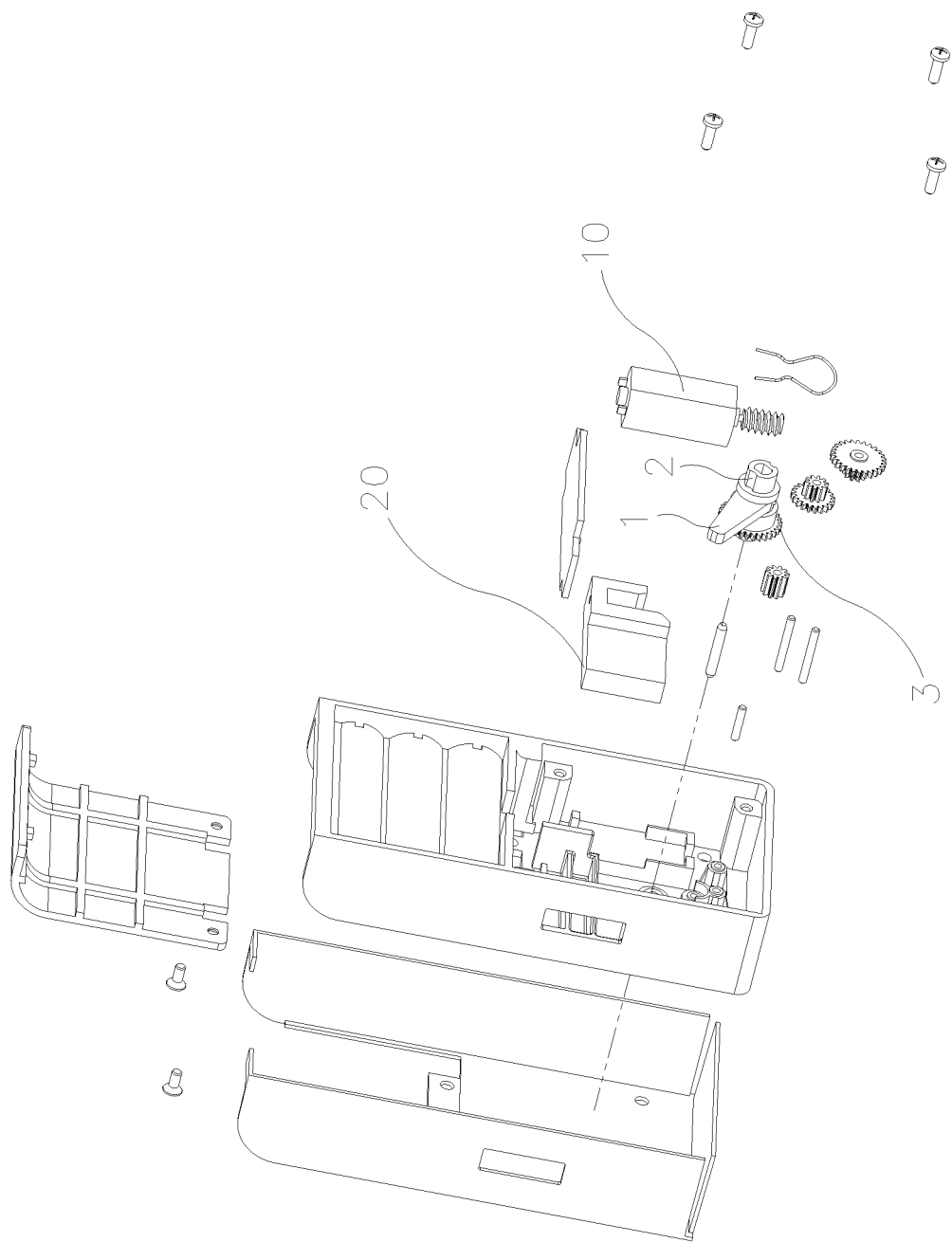
FIG. 4 is an exploded view of the application of the present invention.

As shown in FIG. 4, after the keycard is identified as a valid keycard, a motor 10 starts to actuate. The motor 10 drives the gear disc 3 of the clutch assembly by means of a gear set. At this time, the steel ball 6 is located between the sleeve 4 and the cam 1, the steel ball 6 is tangent to the camshaft 2, and the gear disc 3 and the sleeve 4 are relatively immovable. When the gear disc 3 begins to rotate, the sleeve 4 is driven to rotate. The sleeve 4 enables the cam 1 to rotate by means of the transmission force of the steel ball 6, so that the cam 1 drives a lock tongue to rotate. After the lock tongue 20 is in place, magnetic induction is used to detect whether the lock tongue 20 is in place. If it is not in place, an alarm will sound. The keycard is identified again, the motor 10 rotates reversely, and the cam 1 toggles the lock tongue 20 to extend outward. Magnetic induction is used to detect whether the lock tongue 20 is in place. If it is not in place, an alarm will sound. After the lock tongue 20 is fully extended, the cam 1 is pressed against the lock tongue 20, so that the lock tongue 20 cannot be retracted by an external force. When the keycard fails, the sticker is removed. An emergency key is inserted, and the key is turned. The tail of the lock cylinder drives the clutch assembly. The camshaft 2 is rotated, and the steel ball 6 falls into the groove 21 of the camshaft 2. The camshaft 2 is further rotated, and the limit on the camshaft 2 drives the movement of the cam 1 to realize unlocking. When the key is rotated back, the force is transmitted through the steel ball 6 between the inner wall of the cam 1 and the camshaft 2, so that the cam 1 returns to the initial position. After the steel ball 1 is disengaged from the camshaft 2, the mechanism is reset.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A clutch assembly of an electronic cabinet lock, comprising a cam, a camshaft, a gear disc, a sleeve, a snap ring and a steel ball; the cam including a sleeve ring at an inner end thereof and a swing arm at an outer end thereof, the sleeve ring being sleeved on the camshaft by clearance fit and the sleeve ring being inserted in the sleeve by clearance fit, the gear disc being sleeved on an outer wall of the sleeve, the steel ball being mounted in a through groove of a side wall of the cam, the steel ball being located between the sleeve and the cam and the steel ball being tangent to the camshaft; the camshaft being provided with a groove, the groove being configured to receive the steel ball therein; the snap ring being engaged in an annular groove of a lower end of the camshaft for restricting the sleeve.

\* \* \* \* \*